United States Patent

Orchard et al.

[15] 3,676,806

[45] July 11, 1972

[54] POLYLITHIC CRYSTAL BANDPASS FILTER HAVING ATTENUATION POLE FREQUENCIES IN THE LOWER STOPBAND

[72] Inventors: Henry J. Orchard, San Mateo; Desmond F. Sheahan, San Carlos, both of Calif.

[73] Assignee: GTE Automatic Electric Laboratories Incorporated, Northlake, Ill.

[22] Filed: Nov. 6, 1969

[21] Appl. No.: 874,522

[52] U.S. Cl. .......... 333/72

[51] Int. Cl. .......... H03h 9/20, H03h 9/32

[58] Field of Search .......... 333/70, 76, 72; 310/8.2, 8.4, 310/9.4

[56] References Cited

UNITED STATES PATENTS

| | | | |
|---|---|---|---|
| 2,248,776 | 7/1941 | Och | 333/72 |
| 2,271,870 | 3/1942 | Mason | 333/72 |
| 3,416,104 | 10/1968 | Argoudelis | 333/72 |
| 3,517,350 | 6/1970 | Beaver | 333/72 |
| 3,518,573 | 6/1970 | Smith | 331/116 |
| 2,248,776 | 7/1941 | Och | 333/72 |
| 2,859,416 | 11/1958 | Niederman | 333/72 |
| 2,923,900 | 2/1960 | Poschenrieder | 333/72 |
| 2,990,525 | 6/1961 | Grant | 333/72 |
| 3,222,622 | 12/1965 | Curran et al. | 333/72 |
| 3,401,276 | 9/1968 | Curran et al. | 333/72 X |

*Primary Examiner*—Herman Karl Saalbach
*Attorney*—K. Mullerheim, Russell A. Cannon and Leonard R. Cool

[57] ABSTRACT

A bandpass crystal filter of the type which uses coupled resonators and has a shunt capacitor at the junction between pairs of coupled resonators exhibits a stopband loss-frequency characteristic which is approximately symmetrical and monotonic. In some applications, it is necessary to sharpen up at least one side of the filter and this extra loss could be obtained if one or more frequencies of infinite loss could be added in the adjacent stopband. By connecting the parallel combination of a capacitor and a two-terminal quartz resonator across the junction between pairs of coupled resonators, the loss-frequency characteristic may be modified to include frequencies of infinite loss in the lower stopband.

5 Claims, 8 Drawing Figures

"PRIOR ART"

"PRIOR ART"

"PRIOR ART"

INVENTORS
HENRY J. ORCHARD
DESMOND F. SHEAHAN
BY
Leonard R. Cool
AGENT

POLYLITHIC CRYSTAL BANDPASS FILTER HAVING ATTENUATION POLE FREQUENCIES IN THE LOWER STOPBAND

BACKGROUND OF THE INVENTION

1. Field of the Invention

The invention relates to electrical wave filters using piezoelectric elements as the primary frequency determining components. Such filters include significant structure permitting free transmission of electric waves of a single frequency or band of frequencies while attenuating substantially electric waves having other frequencies.

2. Description of Prior Art

The use of piezoelectric elements in electric wave filters is well known. In the past, separate piezoelectric resonator elements such as quartz crystal resonators were connected together in a lattice configuration to form a filter. Sometimes, one or two piezoelectric resonators were associated with an inductor-capacitor ladder filter in order to produce sharp spikes of loss in the stopband of the filter. More recently a number of crystal resonators were formed on the same AT-cut quartz crystal base. These resonators did not interfere with each other because the loading effect of the plating reduced their resonant frequencies below the natural frequency determined by the cut and thickness of the unplated crystal. This is similar to the situation in microwave wave-guide transmission where the operating frequency is below the cutoff frequency of the waveguide. As a result, the energy is essentially trapped beneath the plates of the resonator. With proper spacing no coupling occurs between the various resonators on the crystal. Thus, each resonator acts as if it were on a separate crystal base. For detailed information on filters made using multiresonator crystals, reference may be made to the article by Mailes and Beuerle entitled "Incorporation of Multi-Resonator Crystals into Filters for Quantity Production" which appears on pages 309—342 of the Proceedings of the 20th Annual Symposium on Frequency Control held in Atlantic City in 1966.

A further development of this idea has been to place two such resonators close enough together on the crystal blank so that there is some mechanical coupling between the oscillations of the separate resonators. The effect of this mechanical coupling is to introduce a coupling capacitance into the equivalent electrical circuit of the two resonators. Several such coupled resonators have been electrically connected in tandem to form an equivalent ladder structure which has a bandpass loss-frequency characteristic. These are designated polylithic crystal filters. A yet different development has been to have several resonators on the same crystal blank, arranged in line so that each resonator is coupled mechanically to the resonators on each side of it. By suitable choice of the resonant frequencies and the amounts of coupling the whole device may be designed to behave as a bandpass filter. These are designated monolithic crystal filters. Some aspects of monolithic crystal filter design considerations and performance characteristics are discussed in the article by Beaver and Sykes entitled "High Frequency Monolithic Crystal Filters with Possible Applications to Single Frequency and Single Side Band Use" published in the Proceedings of the 20th Annual Symposium on Frequency Control on pages 288—308. Hereafter we are concerned with the polylithic filter and with modifications that can be made to it.

A physical representation of a coupled resonator is shown in FIG. 1 wherein rectangular electrodes 2 and 5 appear on the top side of the crystal 1 and matching electrodes, not visible in the figure, appear directly below electrodes 2 and 5, thereby, forming two separate resonators, A and B. It should be noted that the shape of the electrodes is not significant. The connecting leads are run out in opposite directions so that they are not one on top of the other and these leads are denoted 3 and 4 for resonator A and 6 and 7 for resonator B.

The resonators must be placed so that the coupling between the resonators via path 8 is at the desired value. If the resonators are too far apart the mechanical coupling is effectively zero and there would be no energy coupling between the two resonators. If the resonators are very close together the mechanical coupling is at its maximum value.

The structure of FIG. 1 is balanced but it is normally represented and used in terms of its equivalent unbalanced electric circuit which is shown in FIG. 2. In practice, terminals 4 and 7, FIG. 1, would probably be physically joined together but this is not necessary. The circuit 10 of FIG. 2 is the unbalanced equivalent electric circuit of the pair of coupled resonators shown in FIG. 1. The external lead connections to resonators A and B are given the same identifying numbers as were used in FIG. 1 for purposes of relating the two drawings. The resonator A consists of the electrostatic capacitor designated 13 which is connected in shunt across the external leads 3 and 4 and the series resonant LC circuit consisting of motional capacitor designated 14 and inductor 15. The mechanical coupling capacitor 8 is in shunt across the equivalent electric circuit path through the coupled resonators. The structure of resonator B is similar to that described for resonator A.

A crystal filter which uses four such coupled resonator circuits is shown in FIG. 3. The coupled resonators, 10, 10′, 10″ and 10‴ all have equivalent circuits similar to that shown in FIG. 2 but they will not necessarily be identical one to the other. The intermediate capacitors designated 22, 23 and 24 are external to the resonators and are selected to have a value that is of the same order of magnitude as the mechanical coupling capacitance of the resonators. End capacitors 26 and 28 are also external to the resonators and are selected to obtain the desired input and output impedance characteristics. Each of these capacitors is of a high Q type such as mica or ceramic so that their use does not materially degrade the performance of the crystal filter.

Such a filter has a monotonic and symmetrical loss-frequency characteristic such as is shown by curve 30 in FIG. 4, and does not include any infinite loss points in the stopbands. While such a loss-frequency characteristic may be acceptable for some applications, the monotonic behavior inherent in such circuits does not allow a reasonably sized filter to provide sufficient loss at frequencies near the passband for some applications. One such application for bandpass filters is in high quality frequency-division multiplex telecommunication systems which employ a single-sideband suppressed-carrier modulation plan. Where a bandpass filter is used to select one sideband from the two sidebands formed by amplitude modulation of a channel carrier by voice frequency signals, the loss-frequency characteristic of the filter must rise quite rapidly to provide adequate suppression of the unwanted sideband. An increase in attenuation in the lower stopband which approximates that indicated by the dashed line 31, would be highly desirable. The monolithic or polylithic filters known to the art did not provide this degree of suppression which is required for use in such applications.

SUMMARY OF THE INVENTION

Applicants have discovered that, by connecting not just a capacitor but a parallel combination of a capacitor and a single quartz crystal resonator across each intermediate junction between a pair of coupled resonators, frequencies of infinite loss, at the resonant frequencies of the quartz resonators, can be introduced in the lower stopband. Proper selection of these infinite loss-frequencies, or pole frequencies, will introduce the additional desired adjacent stopband loss as denoted by the shaded area 31 of FIG. 4. In most crystal filter designs, the crystal blanks should be of about the same size. This is also true with coupled resonator filters, i.e., the crystal blank and electrode sizes should all be about the same for each resonator. In order to make a filter of this invention a practical realization, it is therefore desirable that the areas of the various electrodes, and consequently the inductance of all the resonators involved, have values such that the largest and smallest are in a ratio not exceeding about ten to one. It was discovered that this could be achieved for the structure of the invention within the limitation set by the ratio of inductance values mentioned above.

It is, therefore, an object of this invention to improve the loss frequency characteristic of a crystal filter which uses coupled resonators.

It is a further object of this invention to include one or more poles of loss in the lower stopband.

Other objects and features of the invention will be more fully and clearly understood from the following description taken in conjunction with the accompanying drawings.

DESCRIPTION OF A PREFERRED EMBODIMENT

Figure 1:
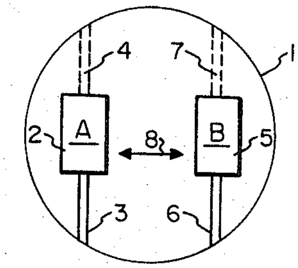
FIGS. 1 through 4 illustrate respectively, a coupled resonator, the equivalent circuit of a coupled resonator, a filter made up using four coupled resonators and the loss-frequency characteristic of such a filter, to which reference has already been made in discussing the background of the invention.
Figure 2:
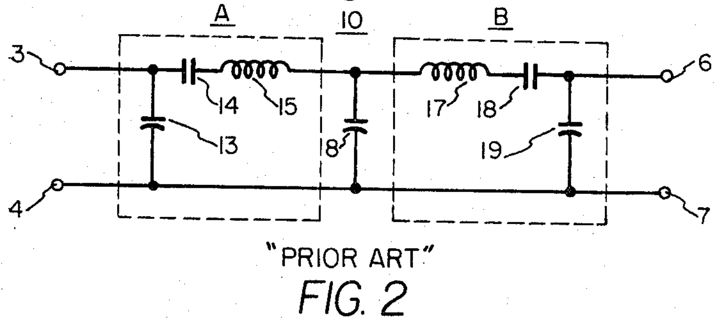
Figure 5:
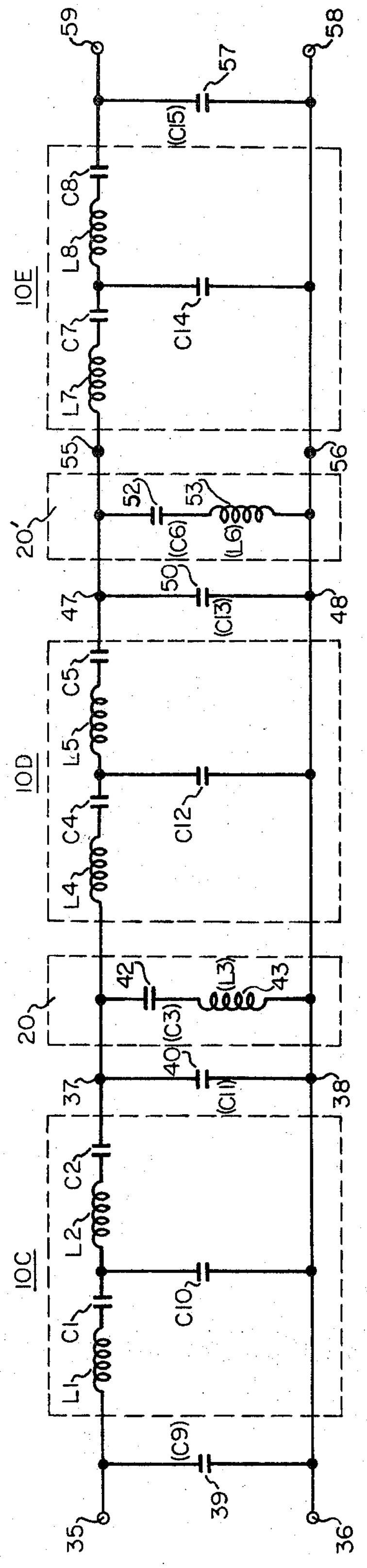
FIG. 5 is a block diagram of a filter according to the invention, employing the quartz crystal resonator at the intermediate junctions of the coupled resonators.
Figure 7:
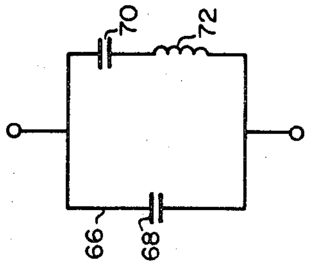
FIG. 7 is the electrical equivalent schematic circuit of a single crystal resonator.
Figure 8:
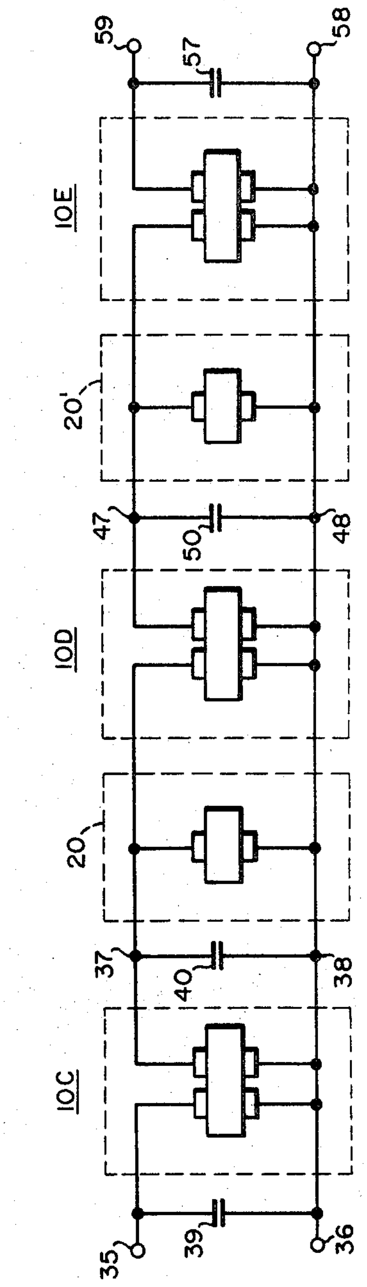
FIG. 8 shows the actual piezoelectric crystal elements in a circuit configuration which is representative of the electrical circuit structure shown in FIG. 5.

A filter employing the teaching of the subject invention is shown in FIG. 5. In order to simplify the drawing and to highlight the teaching of the invention the coupled resonators 10C, 10D, and 10E are simplified in that the shunt capacitors, i.e., 13 and 19 of FIG. 2, are not shown as separate components. Also, the shunt capacitors, i.e., 68 of FIG. 7, associated with the equivalent circuit for the single crystal resonators are not separately shown. In the schematic diagram, FIG. 5 these corresponding associated capacitances are included in the shunt capacitors, $C_9$, $C_{11}$, $C_{13}$, and $C_{15}$. It should be understood, however, that each coupled resonator has the electrically equivalent circuit as shown at 10, FIG. 2.

For purposes of discussion, terminals 35 and 36 are considered to be the two input terminals and terminals 59 and 58 are then the output terminals. Input capacitor 39 connected in shunt across input terminals 35 and 36 and output capacitor 57 connected in shunt across output terminals 59 and 58 are selected, as discussed before, to obtain the desired input and output impedance characteristics.

Figure 3:
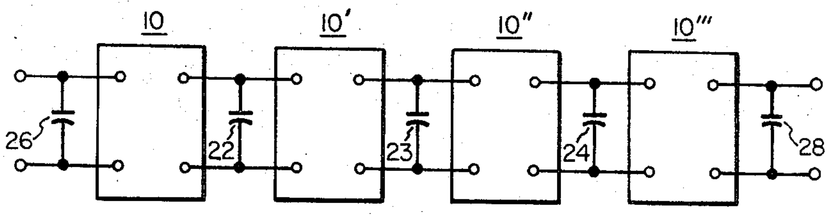

At the intermediate junctions, there are a capacitor and a single crystal resonator in parallel connected across the interconnecting leads. For example, a capacitor 40 and resonator 20 are at the junction between coupled resonators 10C and 10D. Capacitor 40 shown connected across output terminals 37 and 38 of coupled resonator 10C is not of the same value as the intermediate capacitors 22, 23 or 24 shown in FIG. 3, because of the effect of the equivalent shunt capacitance associated with resonator 20, and the shunt capacitances associated with the adjacent coupled resonators. The presence of resonator 20 modifies the capacitance value of capacitor 40. Since the parallel shunt capacitance value of resonator 20 is significant and it is a part of the total shunt capacitance. The capacitance value of capacitor 40 value is selected so that the total equivalent shunt capacitance at the junction is of the same order of magnitude as the mechanical coupling capacitance of the coupled resonator. In addition the series resonant frequency of the resonator 20 as represented by capacitor 42 and inductor 43 is selected to provide a pole of loss in the lower stopband. In the practical realization of such a filter inductor 43 preferably has an inductance that is within 3 to 5 times that of the inductance exhibited by each resonator of the associated pair of coupled resonators. This simplifies the manufacture of the filter and avoids a problem which could occur if the inductance ratios were quite large. Further, the ratios of the electroded areas fall within the practical limits of about 10 to 1 with lower ratios being most desirable from a production point of view. By maintaining a relationship of the inductance values such as that mentioned above, the mechanical dimensions of the resonators are all very similar. It is then possible to optimize the properties of the resonator and each one will be optimum at the same time, thereby, reducing the number of compromises that otherwise would be necessary in the design of the filter.

Figure 6:
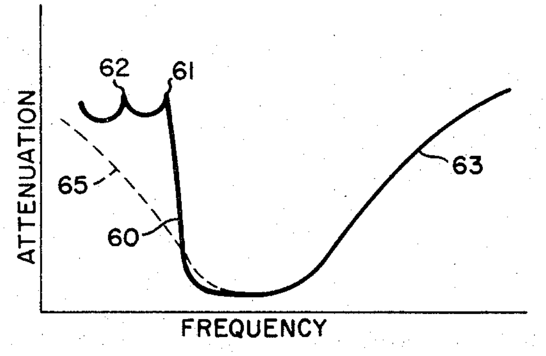
FIG. 6 is a graph showing the low-frequency characteristic of the filter of FIG. 5 in which poles of loss are introduced in the lower stopband.
Figure 4:
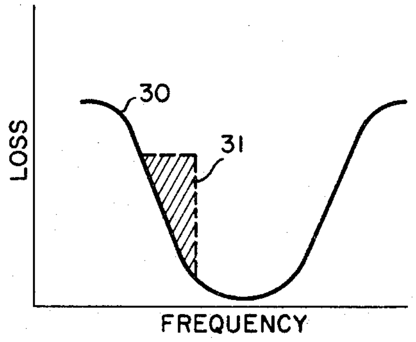

At the intermediate junction between coupled resonators 10D and 10E capacitor 50 has a similar function to that of capacitor 40 and resonator 20' has a similar function to that of resonator 20. The series resonant frequency of 20' may be the same as that of resonator 20 in which case two coincident pole frequencies would appear in the lower stopband. In contrast, the resonators 20 and 20' may have different series resonant frequencies. In such a case, there will be two distinct pole frequencies in the lower stopband. The attenuation frequency characteristic of a filter having two distinct pole frequencies is shown in FIG. 6. The effect of the pole frequencies 61 and 62 in the lower stopband is to sharpen up the lower corner of the passband as indicated at 60, FIG. 6. Thus, the increased loss approximates that indicated by the shaded area of FIG. 4, and the corresponding desired loss-frequency characteristic is obtained by using the techniques of this invention. The relationship between the symmetrical transmission characteristic of the prior art symmetrical filters and the transmission attenuation frequency characteristic of the filter obtained by the teachings of this invention are more clearly illustrated by a comparison of curves 60 and 65 in FIG. 6.

From the foregoing description, it is evident that the present invention provides improvements in the loss-frequency characteristic of bandpass crystal filters made by using coupled resonators. The result is that one or more points of infinite loss may be introduced into the adjacent stopband and the resulting filter is more suitable for use in single-sideband multiplex equipment. The equivalent circuit of a channel filter built according to the teaching of this invention is illustrated in FIG. 5. Such a filter having a passband from about 8140.2 kilohertz to 8143.5 kilohertz, can be constructed using the data contained in the following tables. Rather than giving all of the element values as one might use for a conventional filter, only the effective inductance value of each resonator, the effective capacitance of the mechanical coupling, i.e. 8 of FIG. 2, the capacitance of the capacitor connected at the junctions, e.g. 40 of FIG. 5 which includes the effect of adjacent resonator shunt capacitances and the series resonant frequency for each resonator need to be specified.

TABLES

| Component | Value (mH) |
|---|---|
| $L_1$ | 48 |
| $L_2$ | 48 |
| $L_3$ | 20 |
| $L_4$ | 58 |
| $L_5$ | 58 |
| $L_6$ | 20 |
| $L_7$ | 48 |
| $L_8$ | 48 |

| Component | Value (pF) |
|---|---|
| $C_9$ | 5 |
| $C_{10}$ | 23 |
| $C_{11}$ | 58 |
| $C_{12}$ | 29 |
| $C_{13}$ | 58 |
| $C_{14}$ | 23 |
| $C_{15}$ | 5 |

| Resonator | Resonator Frequency (kHz) |
|---|---|
| $L_1 C_1$ | 8140.5 |
| $L_2 C_2$ | 8139.9 |
| $L_3 C_3$ | 8139.6 |
| $L_4 C_4$ | 8140.5 |
| $L_5 C_5$ | 8140.5 |
| $L_6 C_6$ | 8139.6 |
| $L_7 C_7$ | 8139.9 |

$L_8$ $C_8$ 8140.5

What is claimed is:

1. A bandpass filter employing piezoelectric crystals as the primary frequency determining elements comprising:

a plurality of coupled resonators, having separate piezoelectric crystal bases, connected in tandem, each said coupled resonator comprising a pair of individual resonators sharing the corresponding crystal base, and each said individual resonator having an electrode area on each of the two sides of the base, one electrode being immediately above the other and having physical electrical connections made to each electrode to provide input and output connections, said resonator pair being in spaced relation so that an energy coupling path exists therebetween via the coupled crystal base which path is represented electrically by a mechanical coupling capacitor;

circuit connections for connecting the output of one of the plurality of coupled resonators to the input of the succeeding coupled resonator thereby forming a junction between adjacent pairs of coupled resonators; and resonance means connected across each said junction said resonance means comprising a capacitor and a piezoelectric crystal resonator connected across each junction, said capacitor being selected to provide an equivalent shunt capacitance at said junction that is of the same order of magnitude as the mechanical coupling capacitor of the associated pair of coupled resonators, said resonance means providing an attenuation pole in the lower stopband.

2. The filter as defined in claim 1 wherein the ratio of the electroded area of the coupled resonators to the electroded area of said single crystal resonator is kept to near unity.

3. The filter as defined in claim 1 wherein the ratio of the electroded area of the coupled resonators to the electroded area of said single crystal resonator is not more than 10:1.

4. The filter defined in claim 1 wherein said resonators are formed on AT-cut quartz crystals.

5. The filter as defined in claim 1 wherein the equivalent circuit of the crystal resonator is represented by a capacitor in parallel with a series inductor-capacitor circuit and the inductor of each single crystal resonator at said junction has a value in the range of 3 to 5 times the inductance value exhibited by each resonator of the associated pair of coupled resonators.

* * * * *